(12) United States Patent
Whelan et al.

(10) Patent No.: US 7,522,906 B2
(45) Date of Patent: Apr. 21, 2009

(54) MOBILE UNIT CONFIGURATION MANAGEMENT FOR WLANS

(75) Inventors: Robert Whelan, Kirkland, WA (US); Lamar van Wagenen, Sandy, UT (US); Roy Morris, Bothel, WA (US)

(73) Assignee: Wavelink Corporation, Seattle, WA (US)

( * ) Notice: Subject to any disclaimer, the term of this patent is extended or adjusted under 35 U.S.C. 154(b) by 1138 days.

(21) Appl. No.: 10/215,701

(22) Filed: Aug. 9, 2002

(65) Prior Publication Data

US 2004/0203593 A1    Oct. 14, 2004

(51) Int. Cl.
*H04M 1/66* (2006.01)

(52) U.S. Cl. .................. 455/411; 455/410; 455/426.1; 455/418

(58) Field of Classification Search .............. 455/456.3, 455/41.2, 422, 450, 426.2, 67.11, 226.1, 455/67.16, 214, 525, 411, 410, 426.1, 418, 455/515, 434; 725/25; 370/338, 349, 474, 370/252; 713/1, 100
See application file for complete search history.

(56) References Cited

U.S. PATENT DOCUMENTS

| | | | |
|---|---|---|---|
| 5,159,625 A | 10/1992 | Zicker |
| 5,241,598 A | 8/1993 | Raith |
| 5,586,304 A | 12/1996 | Stupek, Jr. et al. |
| 5,588,143 A | 12/1996 | Stupek, Jr. et al. |
| 5,732,275 A | 3/1998 | Kullick et al. |
| 5,742,829 A | 4/1998 | Davis et al. |
| 5,764,899 A | 6/1998 | Eggleston et al. |
| 5,809,251 A | 9/1998 | May et al. |
| 5,809,287 A | 9/1998 | Stupek, Jr. et al. |
| 5,812,531 A | 9/1998 | Cheung et al. |
| 5,838,730 A | 11/1998 | Kripps |
| 5,870,610 A | 2/1999 | Beyda |
| 5,896,566 A | 4/1999 | Averbuch et al. |
| 5,901,320 A | 5/1999 | Takahashi et al. |
| 5,905,719 A | 5/1999 | Arnold et al. |
| 5,909,437 A | 6/1999 | Rhodes et al. |
| 5,930,513 A | 7/1999 | Taylor |
| 5,930,704 A | 7/1999 | Kay et al. |
| 5,974,312 A | 10/1999 | Hayes et al. |

(Continued)

FOREIGN PATENT DOCUMENTS

EP    1 081 895    3/2001

(Continued)

OTHER PUBLICATIONS

International Search Report for Appl. No. PCT/US2003/024885 dated Sep. 20, 2004.

(Continued)

*Primary Examiner*—Tan Trinh
(74) *Attorney, Agent, or Firm*—Jones Day

(57) ABSTRACT

A system for enforcing configuration requirements for hardware and software on mobile units operating on Wireless Local Area Networks (WLAN). The system allows the configuration policy to change dynamically with the access point or sub-network association. Whenever a mobile unit connects to a new sub-network or access point, the system invokes and then verifies the proper configuration profile for that sub-network or access point. Thus the system ensures the configuration of the mobile unit meets the requirements for the sub-network being used.

84 Claims, 9 Drawing Sheets

U.S. PATENT DOCUMENTS

| | | | |
|---|---|---|---|
| 5,987,575 | A | 11/1999 | Yamaguchi |
| 5,999,741 | A | 12/1999 | May et al. |
| 6,006,034 | A | 12/1999 | Heath et al. |
| 6,009,274 | A | 12/1999 | Fletcher et al. |
| 6,023,585 | A | 2/2000 | Perlman et al. |
| 6,047,129 | A | 4/2000 | Frye |
| 6,049,671 | A | 4/2000 | Slivka et al. |
| 6,052,531 | A | 4/2000 | Waldin, Jr. et al. |
| 6,052,600 | A | 4/2000 | Fette et al. |
| 6,075,943 | A | 6/2000 | Feinman |
| 6,078,663 | A | 6/2000 | Yamamoto |
| 6,134,593 | A | 10/2000 | Alexander et al. |
| 6,167,137 | A | 12/2000 | Marino et al. |
| 6,167,514 | A | 12/2000 | Matsui et al. |
| 6,178,512 | B1 | 1/2001 | Fifield |
| 6,243,747 | B1* | 6/2001 | Lewis et al. ................ 709/220 |
| 6,332,077 | B1* | 12/2001 | Wu et al. ................ 455/432.1 |
| 6,345,043 | B1* | 2/2002 | Hsu ............................ 370/324 |
| 6,347,398 | B1 | 2/2002 | Parthasarathy et al. |
| 6,453,159 | B1 | 9/2002 | Lewis |
| 6,463,584 | B1 | 10/2002 | Gard et al. |
| 6,490,291 | B1 | 12/2002 | Lee et al. |
| 6,526,506 | B1 | 2/2003 | Lewis |
| 6,611,500 | B1 | 8/2003 | Clarkson et al. |
| 6,628,934 | B2 | 9/2003 | Rosenberg et al. |
| 6,651,191 | B1* | 11/2003 | Vacante et al. ................ 714/47 |
| 6,674,738 | B1* | 1/2004 | Yildiz et al. ................ 370/338 |
| 6,701,435 | B1 | 3/2004 | Numao et al. |
| 6,735,691 | B1* | 5/2004 | Capps et al. .................... 713/1 |
| 6,782,263 | B1 | 8/2004 | Peltola et al. |
| 6,788,656 | B1 | 9/2004 | Smolentzov et al. |
| 6,870,822 | B2 | 3/2005 | Balogh |
| 6,950,670 | B2 | 9/2005 | Chang et al. |
| 7,116,943 | B2* | 10/2006 | Sugar et al. ............... 455/67.11 |
| 2001/0023421 | A1* | 9/2001 | Numao et al. .................... 707/9 |
| 2001/0023446 | A1 | 9/2001 | Balogh |
| 2002/0007407 | A1 | 1/2002 | Klein |
| 2002/0057803 | A1 | 5/2002 | Loos et al. |
| 2002/0077094 | A1 | 6/2002 | Leppanen |
| 2002/0085701 | A1* | 7/2002 | Parsons et al. ......... 379/211.01 |
| 2002/0085719 | A1 | 7/2002 | Crosbie |
| 2002/0105925 | A1 | 8/2002 | Shoemake |
| 2002/0116698 | A1 | 8/2002 | Lurie et al. |
| 2002/0157090 | A1 | 10/2002 | Anton, Jr. |
| 2002/0178241 | A1* | 11/2002 | Eriksson ..................... 709/222 |
| 2002/0183056 | A1 | 12/2002 | Lundblade et al. |
| 2002/0198013 | A1 | 12/2002 | Panasik et al. |
| 2003/0005290 | A1 | 1/2003 | Fishman et al. |
| 2003/0005427 | A1 | 1/2003 | Herrero |
| 2003/0013434 | A1 | 1/2003 | Rosenberg et al. |
| 2003/0032417 | A1 | 2/2003 | Minear et al. |
| 2003/0033209 | A1 | 2/2003 | Minear et al. |
| 2003/0060896 | A9 | 3/2003 | Hulai et al. |
| 2003/0061606 | A1* | 3/2003 | Hartwig et al. ................ 725/25 |
| 2003/0065784 | A1* | 4/2003 | Herrod ........................ 709/227 |
| 2003/0078037 | A1* | 4/2003 | Auckland et al. ........... 455/422 |
| 2003/0105838 | A1* | 6/2003 | Presley ....................... 709/220 |
| 2003/0115345 | A1* | 6/2003 | Chien et al. ................ 709/229 |
| 2003/0117985 | A1 | 6/2003 | Kazuo et al. |
| 2003/0135762 | A1 | 7/2003 | Macaulay et al. |
| 2003/0139197 | A1* | 7/2003 | Kostic et al. ................ 455/525 |
| 2003/0186679 | A1 | 10/2003 | Challener et al. |
| 2003/0202486 | A1 | 10/2003 | Anton et al. |
| 2003/0217289 | A1 | 11/2003 | Ammon et al. |
| 2003/0237016 | A1* | 12/2003 | Johnson et al. ................ 714/4 |
| 2004/0022186 | A1 | 2/2004 | Kump et al. |
| 2004/0023639 | A1 | 2/2004 | Noel, Jr. |
| 2004/0023640 | A1 | 2/2004 | Ballai |
| 2004/0025047 | A1* | 2/2004 | Mayne et al. ............... 713/200 |
| 2004/0028123 | A1* | 2/2004 | Sugar et al. ................. 375/224 |
| 2004/0054774 | A1 | 3/2004 | Barber et al. |
| 2004/0063455 | A1* | 4/2004 | Eran et al. ................... 455/525 |
| 2004/0078598 | A1 | 4/2004 | Barber et al. |
| 2004/0082327 | A1 | 4/2004 | Kim et al. |
| 2004/0137915 | A1 | 7/2004 | Diener et al. |
| 2004/0166812 | A1* | 8/2004 | Lumelsky ................ 455/67.11 |
| 2004/0176032 | A1* | 9/2004 | Kotola et al. ................ 455/41.2 |
| 2004/0198319 | A1* | 10/2004 | Whelan et al. .............. 455/411 |
| 2004/0203459 | A1 | 10/2004 | Borras-Chia et al. |
| 2004/0203593 | A1 | 10/2004 | Whelan et al. |
| 2005/0073979 | A1* | 4/2005 | Barber et al. ................ 370/338 |
| 2005/0114649 | A1 | 5/2005 | Challener et al. |
| 2005/0159173 | A1* | 7/2005 | Dowling .................. 455/456.3 |
| 2005/0215263 | A1 | 9/2005 | Tsien et al. |
| 2006/0031557 | A1* | 2/2006 | Walsh et al. ................ 709/232 |
| 2006/0069760 | A1* | 3/2006 | Yeap et al. .................. 709/221 |
| 2006/0092868 | A1* | 5/2006 | Meier ......................... 370/312 |
| 2006/0168438 | A1* | 7/2006 | Klein ............................. 713/1 |

FOREIGN PATENT DOCUMENTS

| | | |
|---|---|---|
| WO | WO 99 01969 | 1/1999 |
| WO | WO 01/61965 A1 | 8/2001 |
| WO | WO 03/083601 A2 | 10/2003 |

OTHER PUBLICATIONS

International Search Report for Appln. No. PCT/US03/20502 dated Dec. 15, 2003.
International Search Report for Appln. No. PCT/US03/15964 dated Dec. 2, 2003.
International Publication No. WO 2003/100561 A3 dated Dec. 4, 2003.
Written Opinion of PCT/US03/15964 dated May 7, 2004.
Article by A.K. Salkintzis, et al.: "WLAN-GPRS Integration For Next-Generation Mobile Data Networks," *IEEE Wireless Communications, IEEE Service Center*, (Oct. 5, 2002, vol. 9, No. 5).
International Search Report for PCT/US02/26265 dated Mar. 13, 2003.
International Search Report for PCT/US03/24180 dated Jun. 1, 2004.
European Search Report EP 00 10 3334 dated Dec. 14, 2000.
Written Opinion of PCT/US/04/004387 dated Aug. 18, 2004.
Published Application No. WO/2004/073243 dated Aug. 26, 2004.
International Search Report of PCT/US/04/004387 dated Aug. 18, 2004.
European Office Action of European Appln. No. 03 785 061.7 dated Sep. 26, 2005.
Article by Bob Brewin: "IBM Develops Tool to Detect Rogue Wireless LAN Access Points," *Computerworld* (Jun. 17, 2002): <URL:http://www.computerworld.com/printthis/2002/0,4814, 72065,00.html>.
Article No. XP-002263356 entitled: "IBM Researchers Demonstrate Industry's First Self-Diagnostic Wireless Security Monitoring Tool," *IBM Research News* (Jun. 17, 2002): <URL:http://www.research. ibm.com/resources/news/20020617_dwsa.shtml>.
Article No. XP-002263357 entitled: "IBM Research Demonstrate Industry's First Auditing Tool for Wireless Network Security," *IBM Research News* (Jul. 12, 2001).
"CA & Partners Real World Management Solutions for Mobile eBus", *LexisNexis*, 3 pages, Apr. 12, 2000.
"On-line Management Becomes the Real Thing: Online Management Products and Services Provided by eStar Technologies and Computer Associates", *Lyn Reiner*, 2 pages, Aug. 27, 1999.
"Partnerships Connect Users with Diagnosis", *LexisNexis*, vol. 6, No. 4, 1 page, Aug. 1999.
Antony Bruno, "Firms Give Mobile Twist to Corporate Apps", *LexisNexis*, vol. 18, No. 31, p. 29, Aug. 2, 1999.
John Saunders, "A New Twist from 3Com, PageNet, CA, Computer Associates International, 3Com and PageNet develop the Twist wireless network management technology, Company Business and Marketing", Jul. 30, 1999, 2 pages.
"PageNet and CA launch wireless extension for Unicenter TNG", Jul. 23, 1999, 1 page.
Computer Associates AWIG: Pagenet and CA announce availability of wireless extension for Unicenter TNG", Jul. 20, 1999, 3 pages.

Antony Bruno VAST unit part of PageNet's Evolution, *LexisNexis*, 2 pages, Jul. 19, 1999.

Blaise Zerega, et al., "CA, PageNet announce paging-based network management" *LexisNexis*, Jun. 16, 1998, 2 pages.

BMC Software Integrates Award Winning Patrol Product with Computer Associates Industry-Leading Unicenter TNG, *LexisNexis*, 3 pages, Mar. 17, 1998.

Jim Duffy, "Tivoli tools target output management", *LexisNexis*, 2 pages, Mar. 2, 1998.

Wireless Predictive Features Near for TNG—Unicenter enhancements come amid slower client-server revenue growth for CA, *LexisNexis*, 1 page, Jan. 26, 1998.

"American Mobile Satellite Corp. and Computer Associates Extend Wireless Enterprise Applications for eBusiness", *LexisNexis*, 2 pages, Apr. 20, 2000.

Joaquim Menezes, Extending The Reach Technology extends remote network connectivity and intelligence to a plethora of remote applications, *Company Business and Marketing*, vol. 26, No. 11, p. 25, 2 pages, May 26, 2000.

EverTrac Partners with Paradigm Advanced Technologies to Advance Location Aware Market for B2B with Unique Out-Of-The-Box Solutions, *Canadian Newswire*, Oct. 24, 2000, 2 pages.

"EverTrac Paradigm form Partnership", 1 page, Oct. 30, 2000.

"CA Debuts New Version of Unicenter TNG SDO", vol. 11, No. 11, 3 pages, Nov. 2000.

Matthew G. Nelson, et al., "CA Takes Unicenter eTrust Wireless with Partners Help—Enterprise Tools Are Designed to Help Companies Manage Multiple Mobile Initiatives", 1 page, Mar. 26, 2001.

Debbie Dubie, "CA Finds Mobile Mgmt. Partners—The Company extends its network mgmt. software to wireless", 2 pages, Mar. 26, 2001.

Polytechnical University selects CA's Inicenter TNG to manage network with new wireless connectivity options, CA's Mobile eBusiness Solution to provide 24×7 system availability for students and faculty *M2 Presswire*, Apr. 27, 2001, 2 pages.

"Computer Associates and w-Technologies deliver multi-platform wireless access to CA's Unicenter TNG; Partnership enables IT staff to manage eBusiness environments from full range of handheld client devices", *M2 Presswire*, May 9, 2001, 2 pages.

"CA extends leadership in mobile management with second wave of strategic partnership Announcements at Networld-Interop underscores value of C A's solutions in next generation wireless implementations", *M2 Presswire*, May 9, 2001, 2pages.

Lucent Technologies to Provide ORiNOCCO Wireless Networking and Internet Access for HP PCs, *PR Newswire*, Jun. 27, 2000, 2 pages.

"HP Stakes Claim in Mobile e-Services Management Market, Nexttenso, Nokia and TANTAU Collaborate with HP Open View for Development of Mobile e-Services Management Software", *Business Wire*, Nov. 14, 2000, 3 pages.

"Broadband Week Direct", Mar. 19, 2001, 4 pages.

Spike Broadband Systems Announces Global OEM Agreement with HP, Spikes to offer Solution based HP Open View to improve Management of Wireless and Wireless Networks, *Business Wire*, Mar. 19, 2001, 3 pages.

"Aether Systems Announces Wireless Management for HP Open View", 1 page No Specific Date announce Jun. 15 Convention with booth information.

* cited by examiner

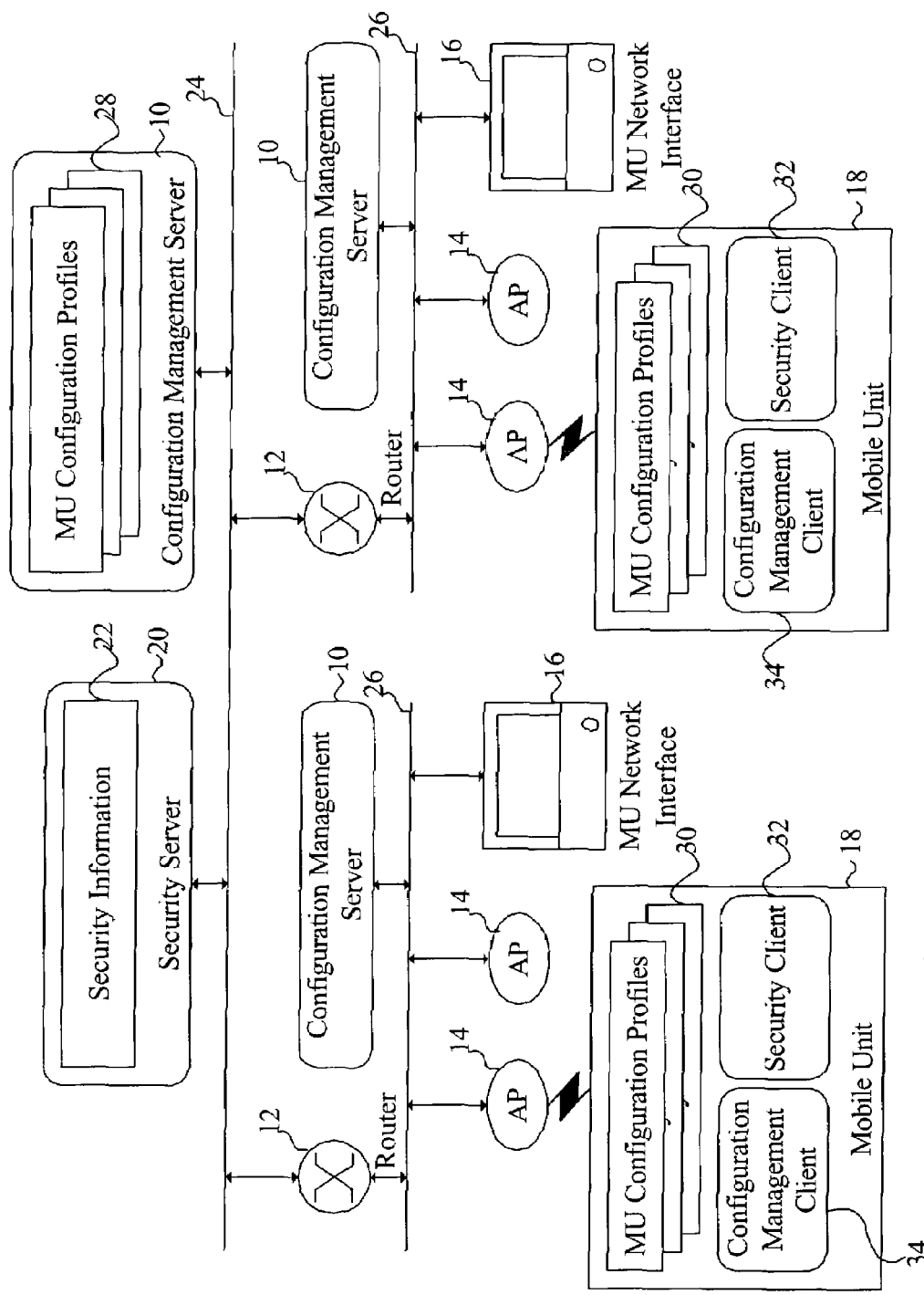
Figure 1. Overall System Block Diagram

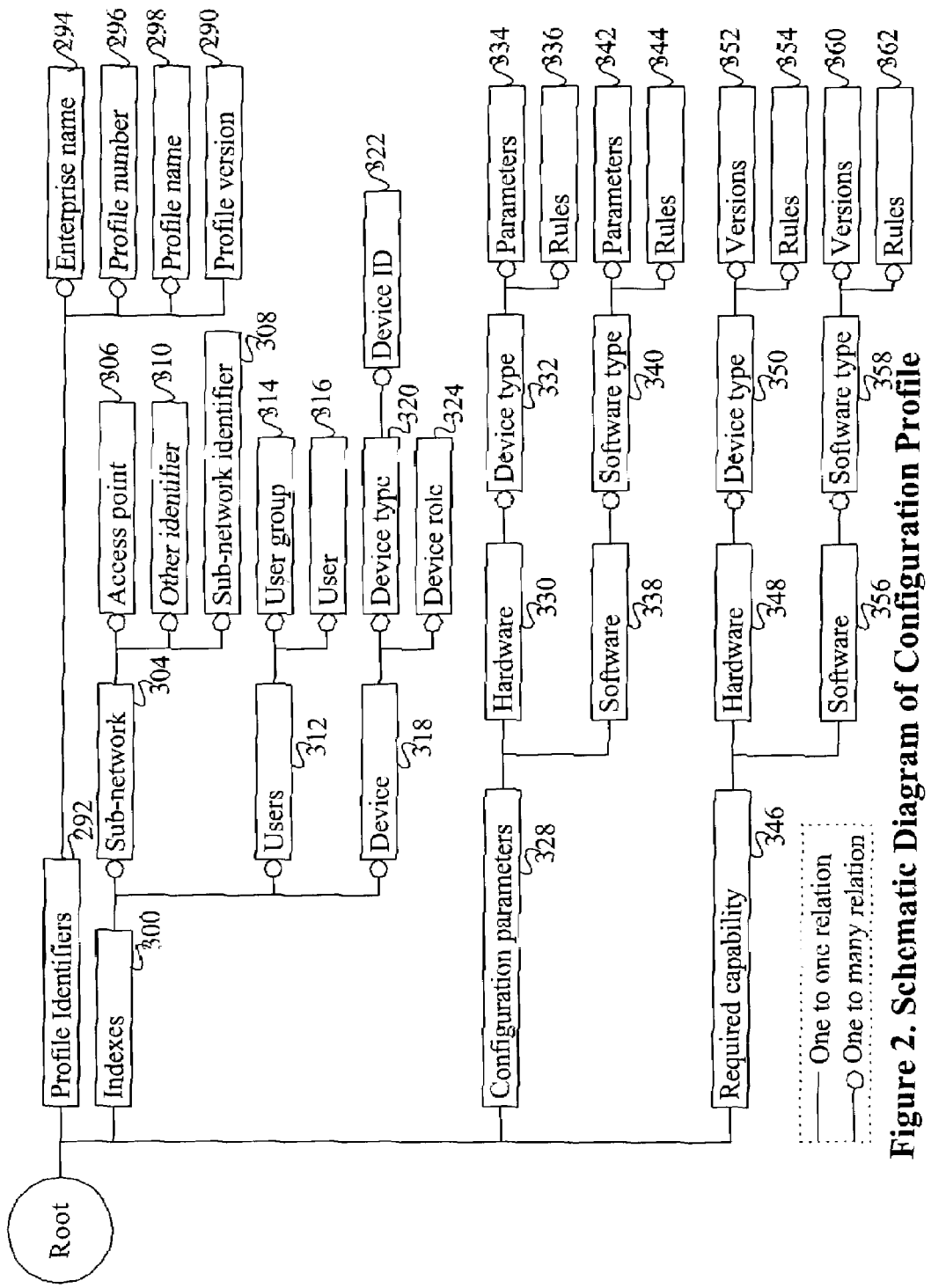
Figure 2. Schematic Diagram of Configuration Profile

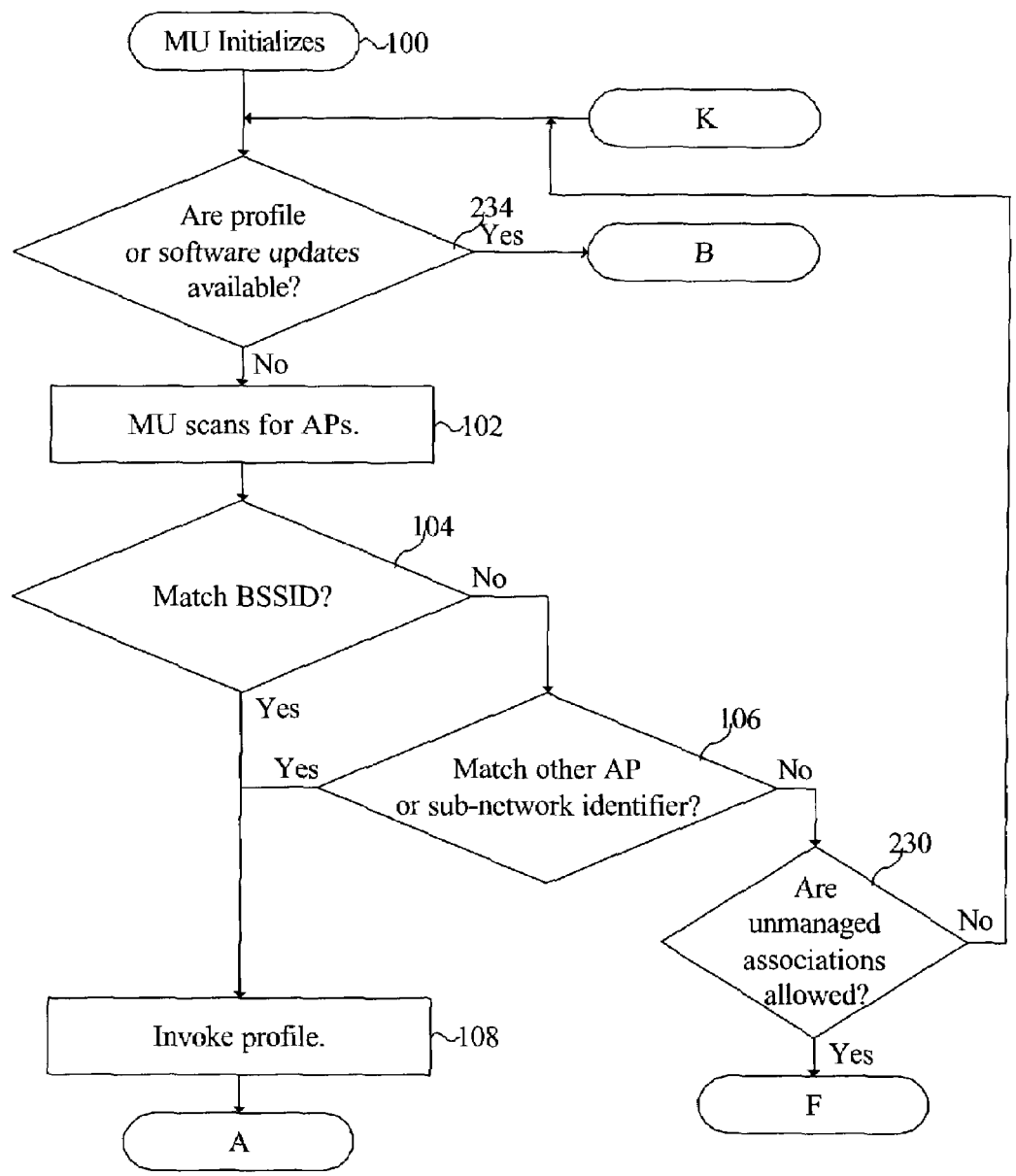
Figure 3 A. Configuration management process

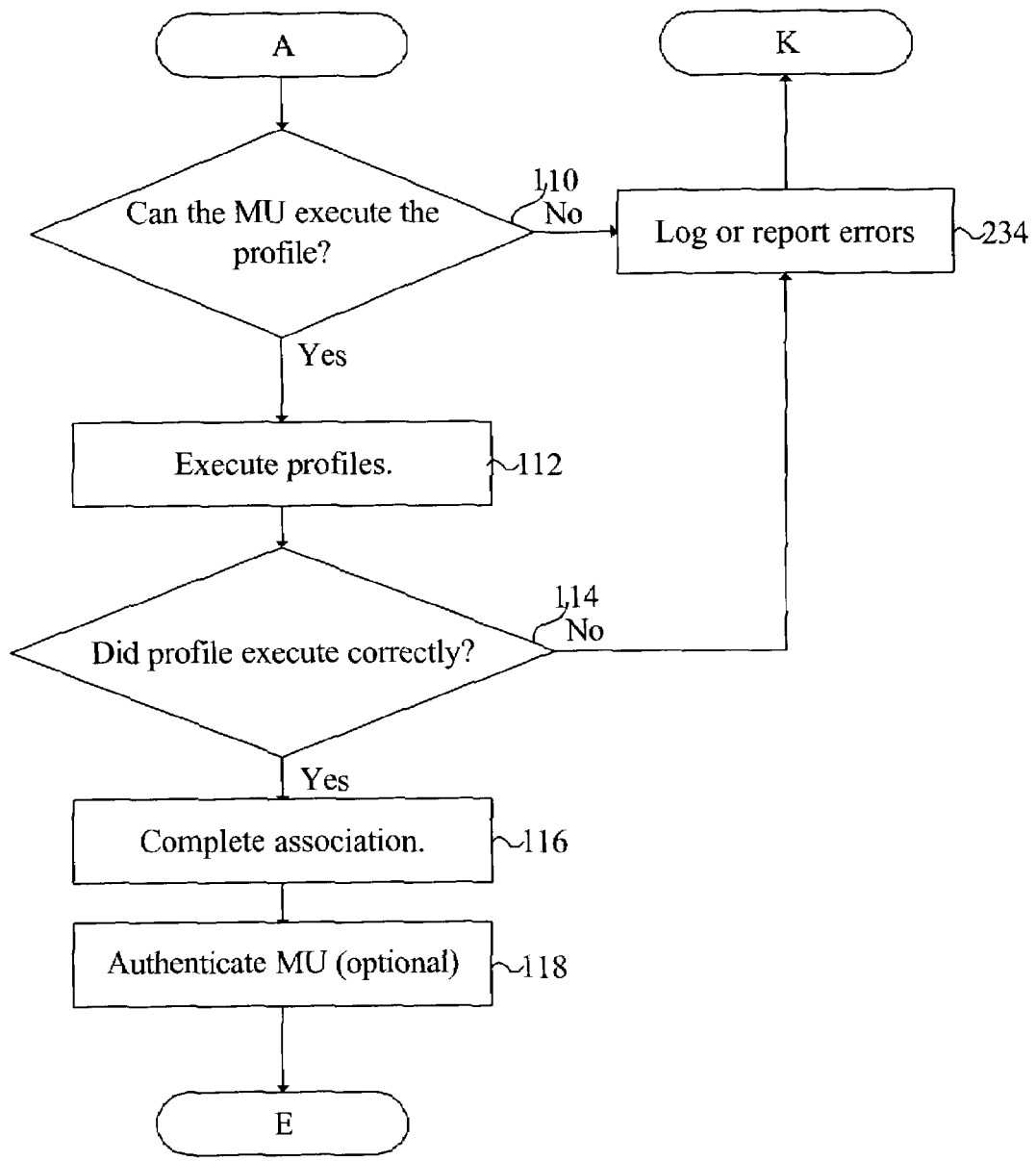
Figure 3 B. Configuration management process

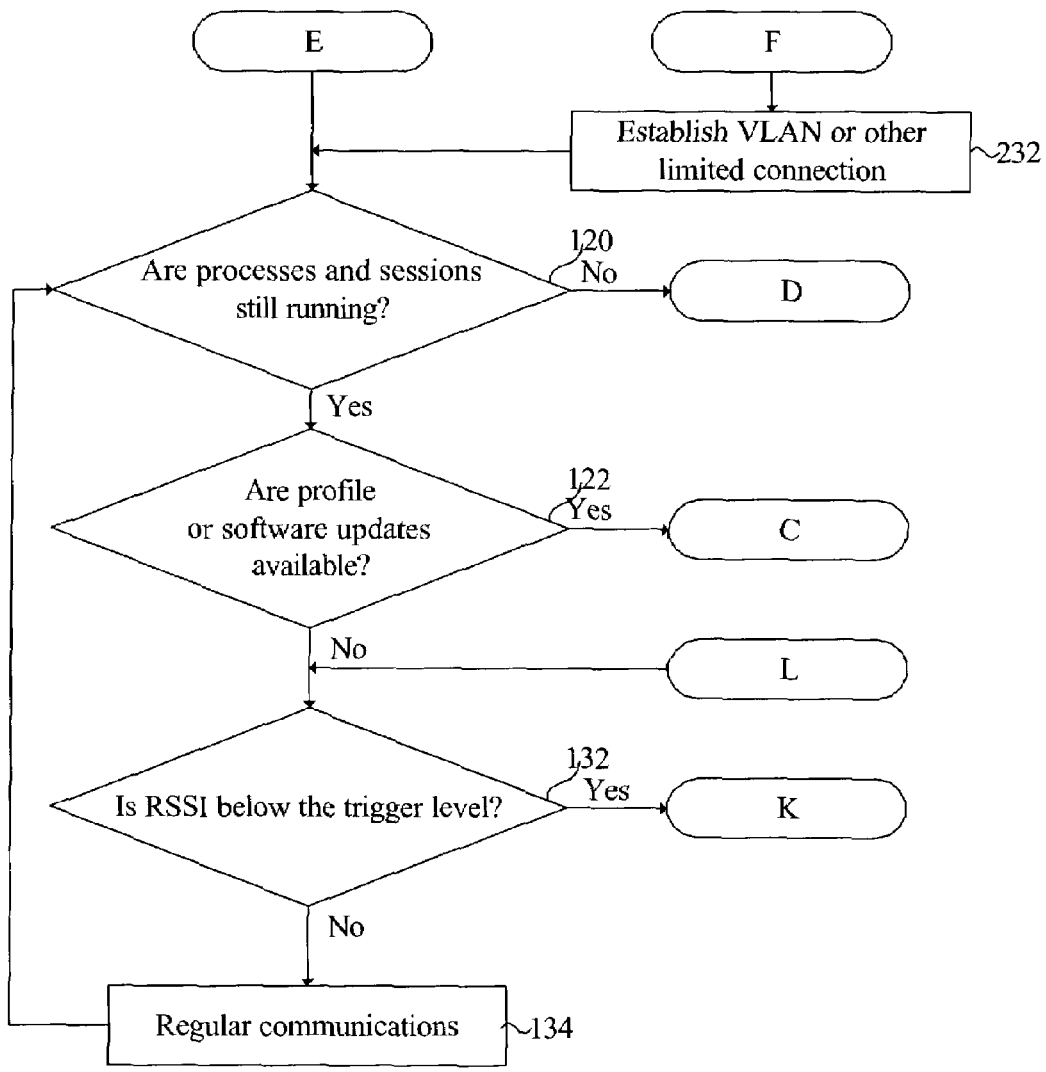
Figure 3 C. Configuration management process

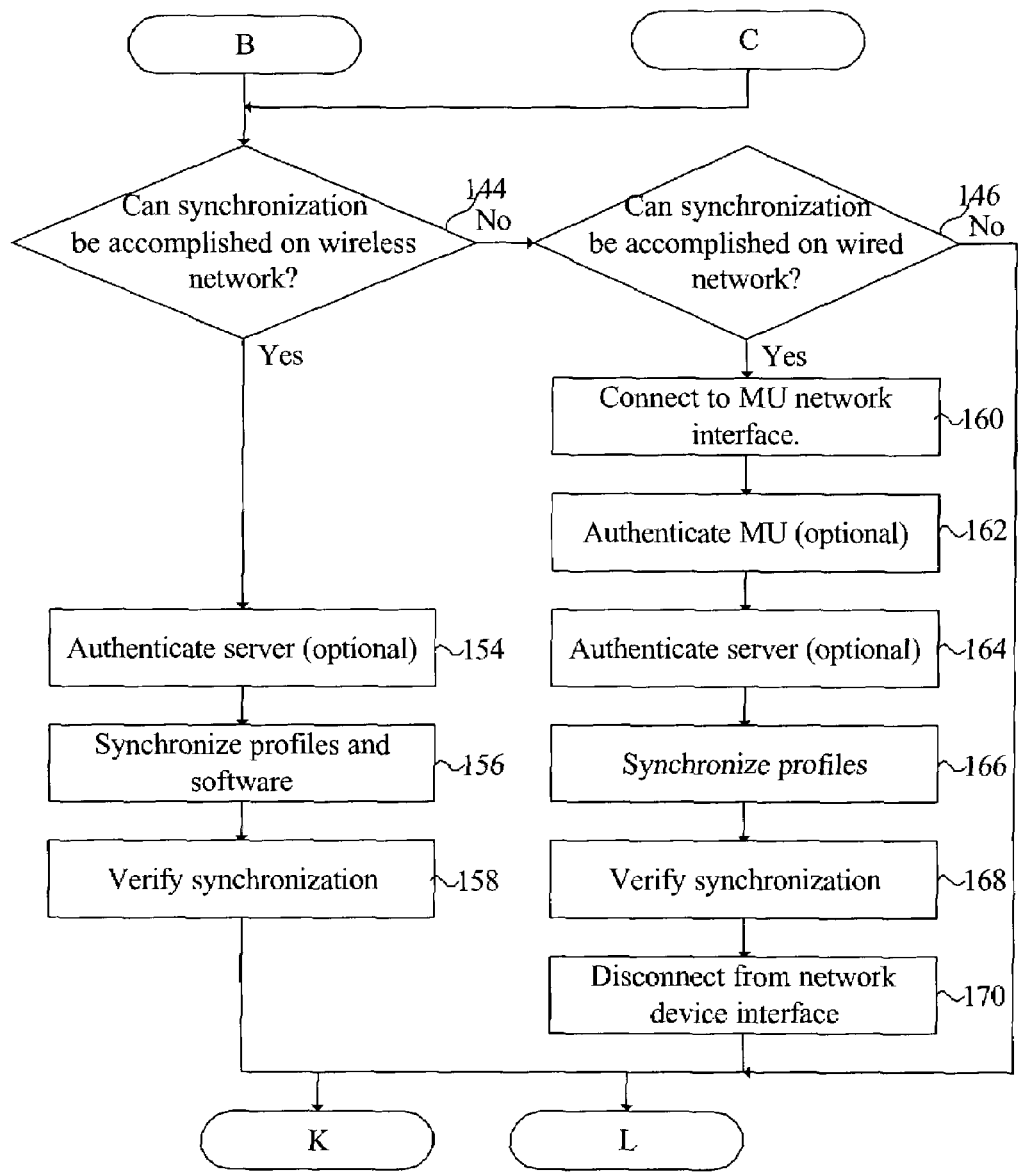
Figure 3 D. Configuration management process

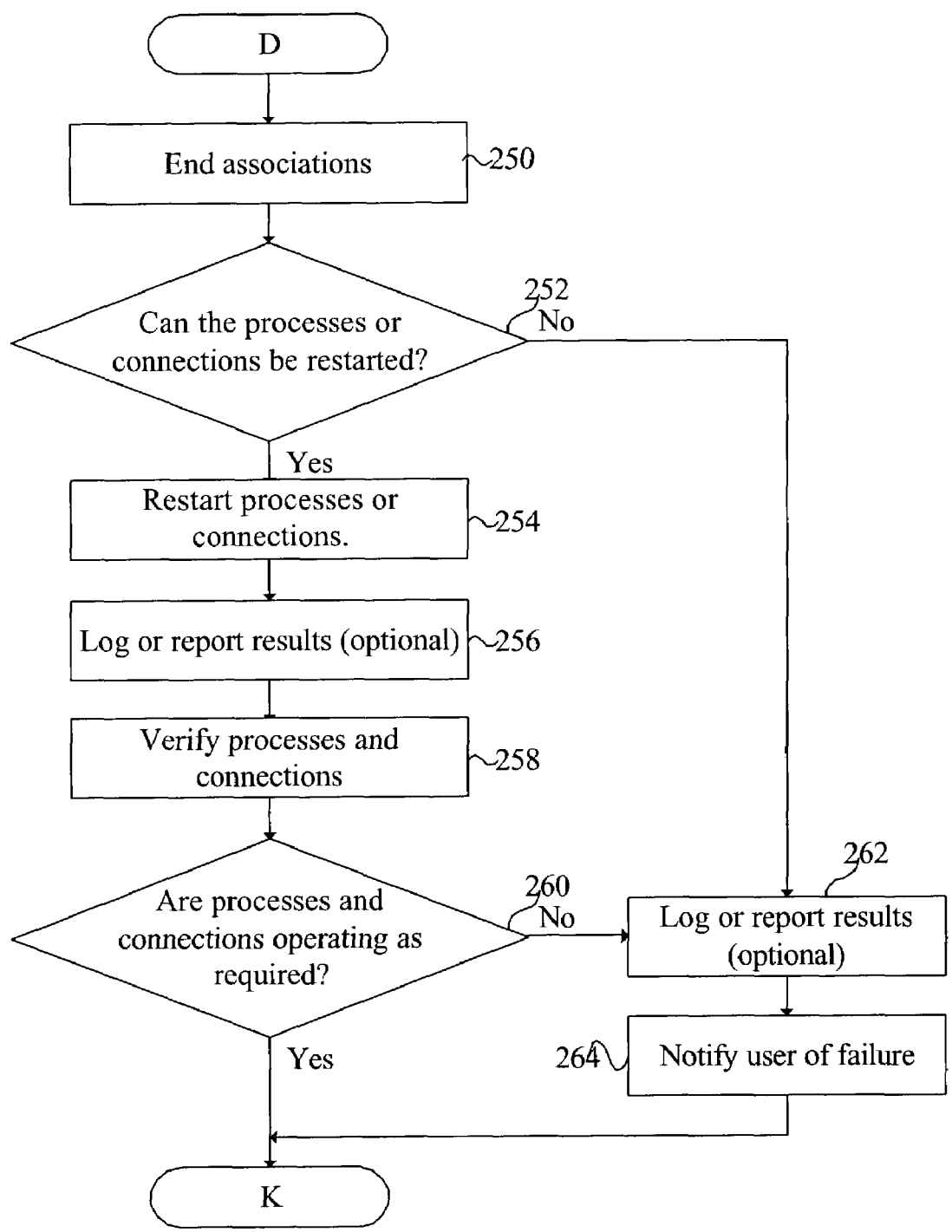
Figure 3 E. Configuration management process

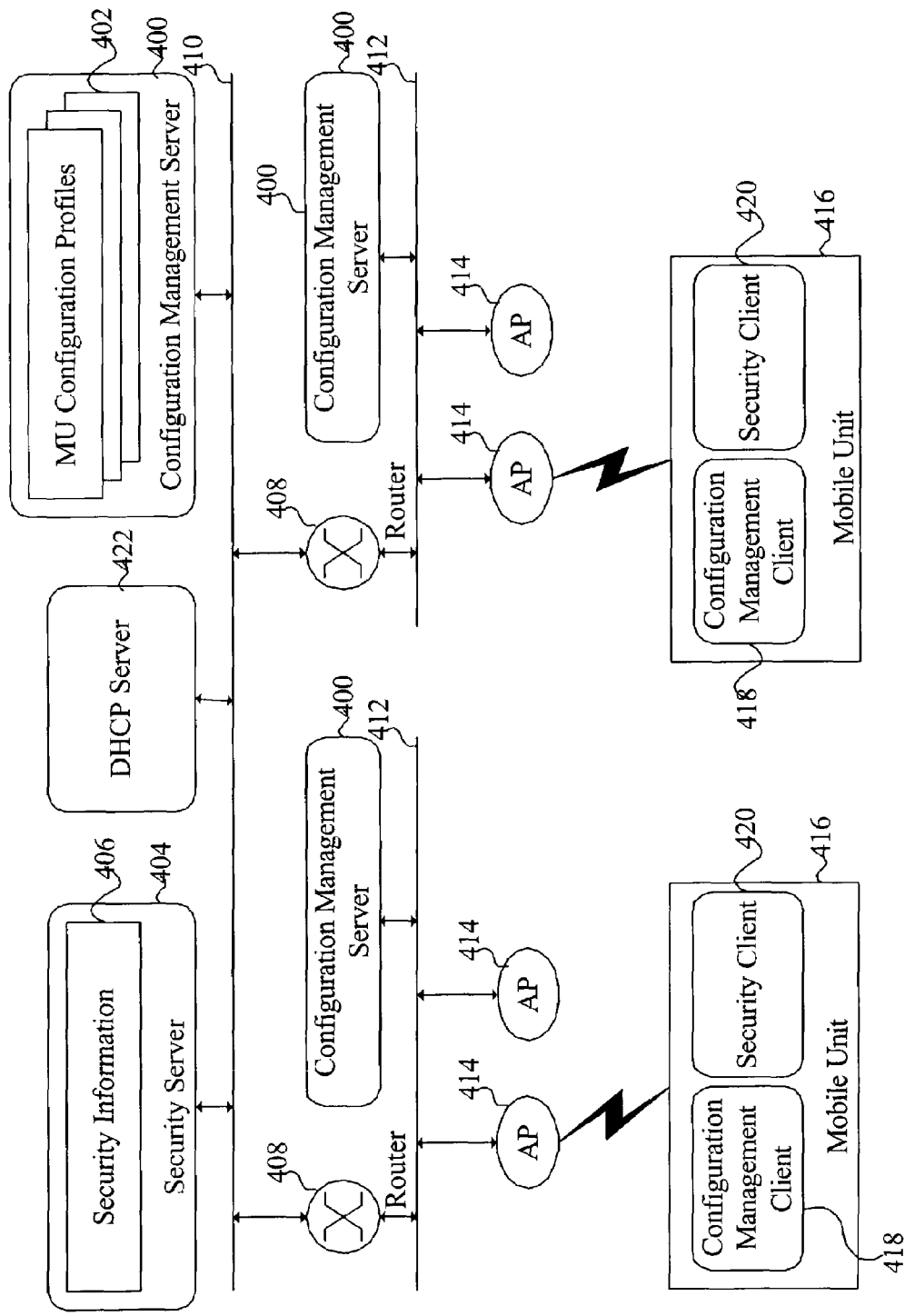
Figure 4. Overall System Block Diagram of Alternative Embodiment

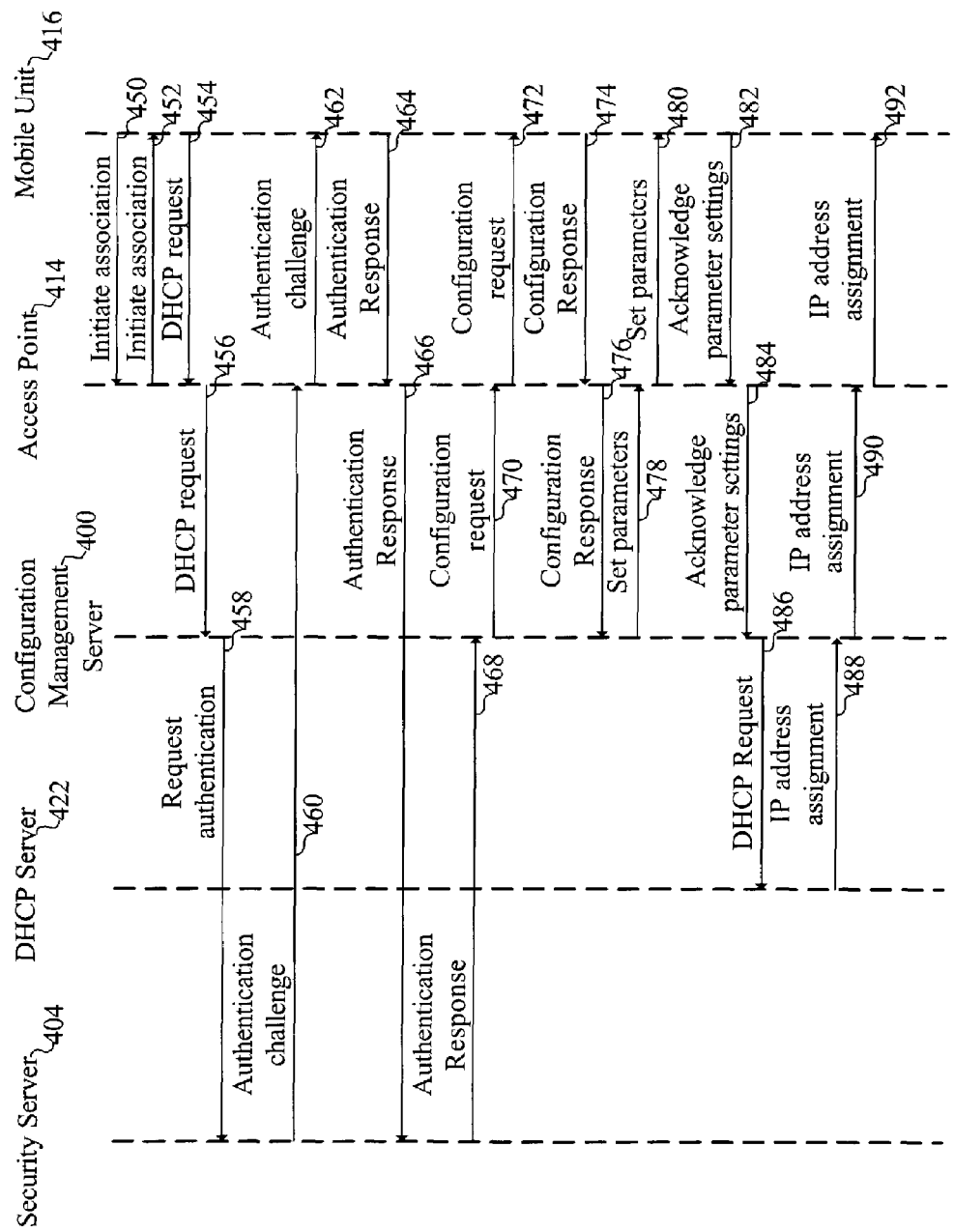
Figure 5. Simplified Process Flow for Alternative Embodiment

MOBILE UNIT CONFIGURATION MANAGEMENT FOR WLANS

FIELD OF THE INVENTION

The present invention relates to the management of configurations of mobile units operating in a Wireless Local Area Network (WLAN) environment. More specifically, the invention relates to a system for managing hardware and software configurations to enforce configuration management policies on mobile units.

BACKGROUND OF THE INVENTION

WLANs are now in common use in both large and small businesses, as public Internet access points, and in home environments. Millions of access points and mobile units are now deployed. Enterprises commonly deploy wireless access points on one or more sub-networks often at multiple geographic locations. There also is a growing trend toward employing Wireless Local Area Network (WLAN) technology for public Internet access points used by travelers or other mobile users.

In a WLAN, one or more base stations or Access Points (AP) bridge between a wired network and radio frequency or infrared connections to one or more mobile stations or Mobile Units (MU). The MUs can be any of a wide variety of devices including, laptop computers, personal digital assistants, wireless bar code scanners, wireless point of sale systems or payment terminals, and many other specialized devices. Most WLAN systems used in business and public access environments adhere to one or more of the IEEE 802.11 family of specifications.

In a typical corporate environment the mobile units roam between the one or more sub-networks used by that enterprise. Often times, the environments and services for these sub-networks are significantly different. The configuration requirements for both hardware and software for the mobile units can therefore change significantly between sub-networks. Management of these configurations for large numbers of mobile units using a large number of sub-networks can be a significant problem. This problem is made more difficult by the fact that third party service providers operate some sub-networks used by the mobile units, while other networks are operated by the enterprise itself. Finally, any practical WLAN configuration management system must provide a method to update the software and configuration information on the mobile units.

Dynamic configuration management of nodes on local area networks is widely practiced. Several examples of well-established dynamic configuration management protocols are known. One widely deployed example is the BOOTP protocol (see RFC951) and its extensions (see for example RFC2132) that allow a server to configure parameters and load files onto a network node under management. However, these protocols, and the related Dynamic Host Configuration Protocol (DHCP; RFC2131) only operate at startup or boot time of the network node and do not attempt to control network access based on the configuration management policies.

Many standard network management tools include dynamic network node configuration management capabilities. Some examples of these tools include the OpenView from Hewlett Packard, the Tivioli network management products from IBM, and the Unicenter management product from Computer Associates. In all cases, these products rely on an existing network connection (i.e. sockets over a TCP/IP protocol) and therefore, none of these products can limit network access based on enforcement of configuration management policies.

U.S. Pat. No. 5,367,635 to Bauer and Kepke discloses a system using the Simple Network Management Protocol (SNMP) to manage configuration parameters and files on network nodes. This system requires an existing TCP/IP connection for SNMP sessions, and therefore cannot limit network access based on enforcement of configuration management policies.

In U.S. Pat. No. 5,651,006 to Fujino, et. al., a hierarchical network management system is disclosed, wherein one or more servers distributed over a hierarchy of sub-networks uses the SNMP protocols to manage the configurations of the nodes on a sub-network specific basis. This system requires an existing TCP/IP connection for SNMP sessions, and therefore cannot limit network access based on enforcement of configuration management policies.

U.S. Pat. No. 5,655,081 to Bonnell, et. al., discloses a system, wherein a network management server uses agents executing a set of specific scripts on network nodes to discover and manage the use of network services. This system requires an existing network connection or sessions (usually running over the TCP/IP protocol), and therefore cannot limit network access based on enforcement of configuration management policies.

U.S. Pat. No. 5,872,931 to Chivaluri discloses a system, wherein a hierarchy of management agents attempts to autonomously run corrective scripts when a fault is detected. This system does not attempt to limit network access based on enforcement and focuses on correction of fault rather than enforcement of configuration management policies.

SUMMARY

The present invention overcomes the deficiencies of prior art WLAN configuration management systems by providing a system to create, update and manage hardware and software profiles for mobile units, which roam across multiple WLAN sub-networks.

In one aspect, the invention comrpises a normal-communications inhibitor, further comprising: an electronic device comprising a representation of data; the data comprising a program for inhibiting normal wireless communications via at least one wireless local area network between a wireless device and at least one resource; the program being configured to allow or inhibit normal communications between the wireless device and the at least one resource based on a compliance determination of whether the wireless device complies with at least one policy; the compliance determination being based on at least one structure/function determination of at least one aspect of the structure or function of the wireless device performed by a program executed on the wireless device. In one preferred embodiment, the at least one policy is selected from a collection of one or more candidate policies based on an identifier of an access point or a sub-network.

In another aspect, the invention comprises a configuration management system, further comprising: a client program executing on a wireless device; the client program being configured to determine an identifier of an access point through which the wireless device may communicate, and based on the determination, select a configuration profile from a collection of one or more configuration profiles and to configure the wireless device in accordance with the configuration profile. In one preferred embodiment, the system further comprises a policy that the wireless device be configured in accord with a determinable profile; the client program being further configured to provide an indication that the wireless device is configured in accord with the profile in order to cause a normal-communications inhibitor to permit normal communications between the wireless device and at least one server program.

In another aspect, the invention comprises a normal-communications inhibitor, further comprising: an electronic device comprising a representation of data; the data comprising a program for inhibiting normal wireless communications via at least one wireless local area network between a wireless device and at least one resource; the program being configured to allow or inhibit normal communications between the wireless device and the at least one resource based on the existence of data representing a policy corresponding to an identifier of an access point or sub-network.

In yet another aspect, the invention comprises a system for the enforcement of configurations of mobile units, further comprising a configuration management software client on the mobile units, one or more servers for controlling the hardware, software and stored data configurations on the mobile units, one or more sub-networks connected to the one or more servers, one or more configuration profiles specific to some of the one or more of the sub-networks on which the mobile units can roam, one or more wireless access points connected to each of the one or more sub-networks and capable of communicating with the mobile units.

It will be appreciated that the foregoing statements of the features of the invention are not intended as exhaustive or limiting, the proper scope thereof being appreciated by reference to this entire disclosure and to the substance of the claims.

BRIEF DESCRIPTION OF THE DRAWINGS

The invention will be described by reference to the preferred and alternative embodiments thereof in conjunction with the drawings in which:

FIG. 1 is an overall diagrammatic view of one embodiment of the invention;

FIG. 2 is a schematic diagram of a configuration management profile for one embodiment of the invention;

FIGS. 3A, 3B, 3C, 3D, and 3E is a configuration management process flow diagram for one embodiment of the invention;

FIG. 4 is overall diagrammatic view of one alternative embodiment of the invention; and, FIG. 5 is a diagram of a simplified process flow for one embodiment of the invention.

DETAILED DESCRIPTION OF THE PREFERRED AND ALTERNATIVE EMBODIMENTS

The following detailed description refers to the accompanying drawings, and describes exemplary embodiments of the present invention. Other embodiments are possible and modifications may be made to the exemplary embodiments without departing from the spirit, functionality and scope of the invention. Therefore, the following detailed descriptions are not meant to limit the invention.

Overview of the Invention

The invention provides the capabilities to enforce configuration requirements for hardware and software on mobile units operating on Wireless Local Area Networks (WLAN). The invention allows the configuration policy to change dynamically with the access point or sub-network association. Whenever a mobile unit connects to a new sub-network or access point, the system invokes and then verifies the proper configuration profile for that sub-network or access point. Thus the system ensures the configuration of the mobile unit meets the requirements for the sub-network being used. Capabilities under configuration management can include;

1. security capabilities and software including, anti-virus software, intrusion detection software, PKI certificates and software, VPN software, shared security keys, master security keys, and other authentication and encryption software or tokens;
2. software applications;
3. enabled network protocols and protocol parameters and settings;
4. enabled operating system versions and settings or parameters;
5. radios and network interface card configurations including, transmit signal strength, transmit and receive channel, and country codes;
6. valid devices, device drivers and firmware for network cards and other devices, and;
7. access to stored data, network printers, shared files and other network services.

Thus the invention provides organizations with the capability to ensure the security, compatibility and capability of mobile units as they roam across any number of sub-networks. In some embodiments a complete/closed system is provided wherein the same configuration parameters are applied to the APs as are provided to the mobile devices thereby combining the management of the APs and mobile devices. A more robust system is therefore provided because, among other things, the best source of the AP configuration is the network management component.

In some embodiments the mobile unit maintains one or more configuration profiles. The correct configuration profile is invoked based on sub-network addresses, access point associations or other sub-network or access point identifier. Examples of sub-network identifiers include sub-network address mask or the Extended Service Set Identifier (ESSID) as defined in the IEEE 802.11 family of specifications. Examples of access point identifiers include MAC address or Base Station Service Identifier (BSSID). The mobile unit can receive the sub-network identifier or access point identifier from beacons broadcast by the access points.

A mobile unit determines the sub-network identifier or access point identifier when it initiates an association or the mobile unit may scan for a known ESSID and BSSID. The mobile unit then invokes the correct configuration profile for that sub-network. The configuration requirements for both hardware and software may be tested against the capabilities of the mobile unit and configuration parameters applied. Configuration requirements can be defined for particular hardware components, software executables, or stored data elements. In some embodiments, the version of the hardware component, software component or stored data is verified. If the configuration requirements can be met and the required capability is available, the hardware and software configuration parameters are set to the values specified in the profile. Once configured, the mobile unit can create a full association with an access point on the sub-network. The system will then, optionally, authenticate the mobile unit, before regular communications are enabled. The mobile unit may also authenticate a server or network association. As an additional optional security step, the system will verify the integrity of any executable programs and stored data on the mobile unit to ensure it has not been altered either accidentally or maliciously. At the same time, integrity and functional tests may be preformed on the mobile unit hardware.

If the mobile unit cannot meet configuration management requirements, it may not be allowed to associate with the sub-network, or may only be granted restricted access. An unauthenticated or unverified mobile unit may also not be allowed access to the network or may have restricted access. Limited network access can be achieved in a number of ways, including the use of Virtual Local Area Networks (VLAN) or access control lists.

In some alternative embodiments, the configuration management servers directly test, control and maintain the configurations on the mobile unit, possibly with the assistance of a configuration management client on the mobile unit. The configuration management servers determine the identification of the sub-network or access point, and invoke the correct profile before the mobile unit can complete the association with that access point or sub-network. The identification information can be acquired from the access point or from information transmitted from the configuration management client on the mobile unit. The server uses the identification information to invoke the correct profile and to test, configure and manage the mobile unit. In some embodiments, the configuration management servers are distributed between the access points. In some of these embodiments, the access points will communicate with the mobile units using Open Systems Interconnect (OSI) Layer 2 protocol (data link layer) communications until the association between the mobile unit and the access point is established. These alternative embodiments eliminate the need to store configuration management profiles on the mobile units or to synchronize those profiles. In other respects the alternative embodiments have the same capabilities and functionality as has already been discussed.

A configuration management server or a configuration management client will periodically test the mobile unit configuration once it has associated with a particular sub-network. The server or client can verify that the configuration parameters and versions of both hardware and software have not been altered. The integrity and functionality of both hardware and software can also be tested periodically. At the same time, the server or client can verify that software executables intended to run are still operating and that required network connections or sessions are still active. These checks ensure that the configuration of the mobile unit has not been altered by a failure, an inadvertent action or a malicious action.

One or more configuration management servers control the configuration profiles for the mobile units. The servers can periodically synchronize the stored profiles with those on the mobile units. The synchronization will generally take place over a secure connection. In most cases, the configuration management server will authenticate the mobile unit and the mobile unit will authenticate the configuration management server before synchronization takes place. If the configuration profiles or configuration management client on the mobile unit are updated a verification can be performed to ensure the integrity of the update. The synchronization procedure can be applied before an association is completed, in the case where a mobile unit does not have the correct profile for a particular sub-network. The servers can also initiate synchronization when updates to some mobile units' profiles become available. In some alternative embodiments, the one or more configuration management servers may maintain and store the profiles and will manage the configurations of the mobile units remotely. In this alternative case, no profile information need be loaded onto the mobile unit.

In some embodiments, the one or more configuration management servers may have the capabilities to update software modules and stored data. The configuration management server can determine which versions of software modules and stored data are present on the mobile unit and update versions to the ones specified in the profiles. In most cases, the configuration management server will authenticate the mobile unit and the mobile unit will authenticate the configuration management server before software is updated. This process can involve both update and rollback of versions. Once software or stored data has been updated the installation can be verified to ensure its integrity. The software update procedure can be applied before an association is completed in the case where the mobile unit does not have the correct software or data to operate on a given sub-network. In some embodiments, the configuration management servers can track the licensed software deployed and used on each mobile unit to ensure that license terms and conditions are adhered to.

In some embodiments, the sub-networks can be interconnected in a hierarchical manner using one or more backbone networks. Routers, the use of firewalls, or other networking isolation or filtering methods may segregate these sub-networks. The configuration management servers can also be organized into a hierarchy. Each server in the hierarchy can control mobile unit configurations on one or more sub-networks. Some servers higher in the hierarchy can serve the role of masters to the other servers. The management of the hierarchical configuration management servers can itself be hierarchical. In general, profile information or policies set at a higher level in the hierarchy can be supplemented, or made more specific, but cannot be changed at a lower level. As an example, a corporate configuration management server may directly control the configurations of mobile units on one or more main headquarters networks. This server will also propagate the base profiles to other servers used by specific departments or at remote sites. These other servers may control the configurations of mobile units on one or more departmental or remote site sub-networks. Personnel at the remote sites or department levels can make allowed changes to the configuration management profiles to support specific local requirements.

In some embodiments, the users of the mobile unit can make changes to the configuration management profiles for their specific device. These changes can allow users to modify the configuration of their mobile units to meet specific application requirements. In general, these changes will supplement, or make more specific, the requirements in the profiles distributed by the configuration management servers, but cannot change policies already set.

In some embodiments, the configuration profiles used are specific to both the sub-network and the particular mobile unit. These mobile unit specific profiles allow a heterogeneous mix of mobile units to use the same sub-networks. At the same time, the configuration profiles of mobile units can be optimized for a specific application or set of applications. Finally, the configuration profile can reflect specific requirements or preferences of an individual user.

This application incorporates the following applications by reference: Internet-deployed wireless system, Ser. No. 09/931,425 filed Aug. 8, 2001; Managed Roaming for WLANS, to Whelan et al., filed Aug. 2, 2002; System and Method for Detecting Unauthorized Wireless Access Points, Ser. No. 10/184,750 filed Jun. 28, 2002; WLAN Security Through the Rotation of WEP Keys, Provisional Ser. No. 60/382,107 filed May 21, 2002; and WLAN Security through the Rotation of WEP Keys, Provisional Ser. No. 60/394,999 filed Jul. 10, 2002.

Overview of One Embodiment

In some embodiments of the invention the configuration management profile information is stored on the mobile unit and used by a local client. In these embodiments, a configuration management server synchronizes the configuration profiles stored on the mobile units. An overall block diagram of one possible embodiment is shown in FIG. 1.

One or more configuration management servers 10 store the profiles 28 for one or more mobile units 18. As a mobile unit roams between the one or more access points 14 on the one or more sub-networks 26, the configuration profile 30 used on the mobile unit is determined by the identity of the access point or sub-network it the mobile unit is associated with. The configuration management client 34 invokes the correct configuration profile and executes it. Periodically, the configuration management client verifies that the required configuration is being maintained. The configuration management server can also distribute software and stored data updates to the mobile units. The one or more sub-networks 26 are connected by one or more backbone networks 24. These networks can be organized in a hierarchy of any required depth. In some deployment situations a network can serve both as a backbone network for other sub-networks and as a sub-network with access points 14. In some embodiments the continuation management server 10 can be distributed between the one or more access points. One or more routers 12, and possibly firewalls, usually interconnect the backbone networks and sub-networks. A configuration management server 10 and security server 20 will provide services to one or more sub-networks. If multiple configuration management servers or multiple security servers are used on one or more of the sub-networks these servers may be arranged in hierarchy to ease the complexity of administration.

The one or more security servers 20 authenticate the one or more mobile units 18 associated with the access points 14 on the sub-networks 26. In some embodiments, the mobile unit can authenticate its network connection through the access point using the security server. The security servers typically use a security client 32 on the mobile unit along with stored security information 22 to complete the authentication process. Depending on the implementation, a wide range of authentication schemes may be suitable including, user name and password schemes, symmetric and asymmetric key authentication, and Public Key Infrastructure methods.

A mobile unit 18 can synchronize configuration profiles 30, software or stored data through the one or more wired sub-networks 26, through the MU network interface 16. Once connected to the MU network interface the mobile unit can directly communicate to the one or more configuration management servers 10 and one or more security servers 20. The MU network interface can be of any suitable type including, a network interface card for direct cable connection, a serial interface or a docking cradle.

In some embodiments of the invention the configuration management server 10 and security server 20 can be implemented using a combination of Lightweight Directory Access Protocol (LDAP) servers and PKI certificate authority servers. These servers can be on one or more servers on the sub-networks 26 or backbone networks 24 or distributed on the access points 14.

Profile Structure

There are many suitable structures for the MU configuration profiles 28, 30. For example, the MU configuration profiles can be stored and maintained in a relational table or data structure or in a suitable Extensible Markup Language (XML) schema. One example of a suitable data structure is illustrated in FIG. 2.

Configuration management profiles are identified using a profile identifier 292, which can include any unique set of identifying information including, an enterprise name 294, a profile number 296 and/or a profile name 298, and a profile version identifier 290. The MU configuration profile 28, 30 can be indexed 300 by one or more different parameters. The configuration management client 34 or configuration management server 10 will match one or more of these indices to determine which profile to use in a given situation. Possible indices can include the following:

1. a sub-network identifier 304, which can be comprised of one or more parameters including, an access point identifier 306 (i.e. BSSID or MAC address), a sub-network identifier 308 (i.e. ESSID) or address, or other identifier 310, used to identify which sub-network or access point the profile is valid for;
2. an indicator of the users 312, which can include, a user group identifier 314, or individual user identifier 316, used to allow profile information to be assigned to a given user of group of users regardless of the mobile unit 18 they are using; and,
3. a device indicator 318, which can include, a device type indicator 320, a specific device identification 322, and the device's role 324 or application, used to assign specific profiles and behaviors to specific types of classes of mobile units 18.

The MU configuration profiles 28, 30 preferably contain sets of configuration parameters 328 for the mobile units 18. These configuration parameters can include 1. parameters for hardware configuration 330 including those specific to a type for device 332 (i.e. a radio driver, network card driver), which can include both parameters 334 and rules 336 for applying or testing the parameters; and,
2. parameters for software configuration 338 including those specific to a software executable 340 (i.e. operating system, application, driver, security client) or stored data, and which can include both parameters 342 and rules 344 for applying or testing the parameters.

The MU configuration profiles 28, 30 preferably contain sets of capability requirements 346 for the mobile units 18. These capability requirements can include 1. requirements for hardware configuration 348 including those specific to a type for device 350 (i.e. a radio, network card driver), which can include both version information 352 and rules 354 for applying or testing version information; and,
2. requirements for software configuration 356 including those specific to a software executable 356 (i.e. operating system, application, driver, security client) or stored data, and which can include both version information 360 and rules 362 for applying or testing version information.

Propagation of Changes

The invention provides capabilities for the one or more configuration management servers 10 to propagate changes in data, software or configuration profiles 28, 30 to the mobile units 18. The configuration management client 34 on the mobile unit will periodically poll the server to determine if synchronization is required. Alternatively, when changes to configuration profiles, data or software become available, the configuration management will notify the configuration management client of the pending synchronization. In this case, the server may maintain records used to determine which mobile units need the updates. In either case the server generally verifies that the mobile units are authenticated, possibly using the services of the security server 20, the security information store 22 and the security client 32. The mobile unit may, optionally, authenticate the server or the sub-network 26 association before receiving the software or profile update. The changes are transmitted, though the access points 14, to the configuration management clients 34, on the mobile unit, which updates the effected files. Alternatively, if the mobile unit is connected to a wired sub-network 26, via the MU network interface 16, the synchronization occurs though this connection. The client and/or the server verify the updates to ensure their integrity. The configuration management server can track the use of licensed software and upgrades. The tracking capabilities can include maintaining records of which mobile unit has each type of licensed software and updating these records when new software or software updates are installed.

Hierarchical Configuration Management

In many practical situations, multiple configuration management servers 10 will be used. The invention provides the capability to manage these multiple servers in a hierarchical structure. Generally, this hierarchy is organized with respect to a mobile unit 18 or a group of mobile units belonging to a particular organization. In other words, each organization with management responsibility for management of mobile units will create and manage a hierarchy suitable for its association policies. Typically, an organization will make one set of servers, under its control, the top of the hierarchy for the mobile units under its control. The one or more configuration management servers 10 can manage mobile unit 18 associations on one or more sub-networks 26. For example, a company may choose to make the servers at the headquarters the top of the hierarchy with servers in departments and other sub-networks or geographic locations organized into a tree structure.

The MU configuration profiles 28 in the hierarchy of configuration management servers 10 can be propagated to the other servers by any suitable methods. Two possible methods are:

1. servers synchronize security information and association lists both up and down the hierarchy so that common information is held by all servers; and,
2. servers act as proxy servers for others up and down the hierarchy and thus do not store all information locally, but rather traverse the hierarchy to find the required information or services.

Process Flow

An example of a process flow for one embodiment of the invention is shown in FIGS. 3A, 3B, 3C, 3D, and 3E. This process flow is only intended as one possible example. Numerous other process flows can be employed, including adding steps, eliminating steps or changing the order of steps without changing the scope or spirit of the invention.

When a mobile unit 18 initializes 100 the mobile unit determines if the profiles 30 or software require synchronization or updating 234 and begins scanning 102 for access points 14 to associate with. In some embodiments the configuration management client 34 periodically polls the configuration management server 10 to determine if synchronization is required. In other embodiments, the configuration management server, rather than the configuration management client, determines the need to synchronize and pushes the updates to the mobile unit.

The access point 14 the mobile unit 18 associates with is chosen in the usual manner using criteria, such as, Received Signal Strength Indication (RSSI). When one or more suitable access points are detected the configuration management client 34 will attempt to match the correct configuration profile 30. The configuration management client will first try to match a profile 104 by the access point BSSID. If this process is not successful the client will attempt to match another AP or sub-network identifier 106 including ESSID or access point MAC address.

Once the correct profile 30 has been identified the configuration management client 34 will invoke it or load it 108. The client may then, optionally, verify 110 that the mobile unit 18 has the correct software, stored data and hardware to execute the profile. The client then executes 112 the instructions and rules for the profile. If the profile can be executed without errors 114 the mobile unit completes 116 the association with the access point 14. If the mobile unit does not have the capability to execute the profile 110, or errors occur 114, the configuration management client will log any errors 234 and the client will determine if the MU configuration profiles 30, data or software needs to be synchronized 234, and the mobile unit will continue to scan for other access points 102.

The security server 20 may then, optionally, authenticate 118 the mobile unit 18, possibly using the security client 32 and security information store 22. The mobile unit may also authenticate the access point or sub-network 26 connection (not shown).

If a correct profile 30 cannot be matched 104, 106 for any available access point access points 14 the configuration management client 34 or other process on the mobile unit 18 determines if an association with the unmanaged mobile unit is allowed 230. If not, the client will determine if the MU configuration profiles 30, data or software needs to be synchronized 234, and the mobile unit will continue to scan for other access points 102. If so, the mobile unit establishes the VLAN or other limited connection 232, and begins the main communications loop.

Once the access point 14 association has been completed 116 and the mobile unit 18 optionally authenticated 118, the configuration management client 34 begins an infinite loop. During the execution of the loop the configuration management client and or the configuration management server 10 periodically verify that the processes, network connections and other sessions are still running 120. The client periodically polls the configuration management server 10 to determine 122 if some of the profile information 30, software or stored data needs to be synchronized with the information 28 stored on the configuration management server. In other embodiments, the configuration management server, rather than the configuration management client, determines the need to synchronize and pushes the updates to the mobile unit.

While the configuration management client 34 continues the loop, the mobile unit 18 may determine that RSSI is below a required level and it should roam 132 to another access point 14. If association with a new access point is required, the client 34 will determine if the MU configuration profiles 30, data or software needs to be synchronized 234, and the mobile unit begins scanning for other access points 102. During most of the time spent in the loop, the mobile unit engages in regular communication 134.

If a configuration management client 34 has determined 234, 122 that it must synchronize MU configuration profiles 30 software or stored data, with the profiles 28, data or software on the configuration management server 10, it first determines if a wireless network association 144 can be used.

If so, the mobile unit 18, optionally, authenticate 154 its connection to the access point 14 or sub-network 26, possibly using the services of the security server 20, stored security information 22, and security client 32. The configuration management client 34 then synchronizes 156 the configuration management profiles 30, software and data with the profiles 28, software and data on the configuration management server 10. The client and/or the server then verifies 158 the integrity of the synchronized information. The integrity check can use any combination of suitable techniques including, file size, file execution or evaluation, check sums, more sophisticated error detection codes, or error correction codes. The client 34 will determine if the MU configuration profiles 30, data or software needs to be synchronized 234, and the mobile unit then begins scanning 102 for acceptable access points or returns to main communications loop and checks RSSI level 132. In other cases the client returns to main communications loop and checks RSSI level 132.

If the configuration management client 34 determines 146 that the mobile unit 18 can synchronize the profiles 30, data and software through the MU network interface 16 the mobile unit is connected to the interface 160. The security server 20, optionally, authenticates 162 the mobile unit, possibly using the security information 22 and the security client 32. The mobile unit can then, optionally, authenticate 164 the server or the sub-network 26 association, generally using the services of the security server and the security client. The profiles, software and data are then synchronized 166 using the services of the configuration management server and the configuration management client 34. The server and/or the client then verify the integrity of the synchronization 168. The integrity check can use any combination of suitable techniques including, file size, file execution or evaluation, check sums, more sophisticated error detection codes, or error correction codes. The mobile unit is then disconnected from the MU network interface 170 and the client 34 will determine if the MU configuration profiles 30, data or software needs to be synchronized 234, and the mobile unit 18 begins scanning 102 for acceptable access points. In other cases the client returns to main communications loop and checks RSSI level 132.

If the configuration management client 34 on the mobile unit 18 or the configuration management server 10 determines that a required process, network connection or session has stop or ended prematurely 120, the client or server will end the mobile unit's association 250 with an access point 14. The client then determines if the process, connection or session can be restarted 252. If so, the client attempts to restart the process, session or connection 254 and logs or reports the results 256. Finally, the client verifies 258 that the restart was successful and verifies that the processes, connections and sessions are still operational 260. If the process, connection or session cannot be restarted 252 or the restart is not successful 260, the client will log or report 262 the error (if possible), notify the user of the failure 264. Once the process has completed (successfully or not) the client 34 will determine if the MU configuration profiles 30, data or software needs to be synchronized 234, and the mobile unit 18 begins scanning 102 for access points 14 with which the mobile unit is capable of associating.

Alternative Embodiment

Some alternative embodiments do not require that profiles be stored on mobile units or synchronized between the mobile units and a configuration management server. In these embodiments the configurations of the mobile units is managed and verified by one or more servers. A block diagram of one possible alternative embodiment is shown in FIG. 4.

One or more configuration management servers 400 store the profiles 402 for one or more mobile units 416. As a mobile unit roams between the one or more access points 414 on the one or more sub-networks 412, the configuration profile 402 used for the mobile unit is determined by the identity of the access point or sub-network it the mobile unit is associated with. The configuration management server invokes the correct configuration profile and executes it, typically using the services of the configuration management client 418. For some embodiments, the configuration profile will use a structure nearly identical to the one already described. Periodically, the configuration management server verifies that the required configuration is being maintained. This verification can include testing that configuration parameters are set, that required processes are running, and required connections and sessions are running. As with some other embodiments, the configuration management server can attempt to restore configurations or restart required processes, sessions and connections. If these attempts fail, the mobile unit may be disconnected from the access points or attempt to connect the mobile unit to other access points with different configuration requirements. The configuration management server can also distribute and verify software and stored data updates to the mobile units, much as is done in some other embodiments.

The one or more sub-networks 412 are connected by a series of one or more backbone networks 410. These networks can be organized in a hierarchy of any required depth. In some deployment situations a network can serve both as a backbone network for other sub-networks and as a sub-network with access points 414. In some embodiments the continuation management server 400 can be distributed between the one or more access points. One or more routers 408, and possibly firewalls, usually interconnect the backbone networks and sub-networks. A configuration management server 400 and security server 404 will provide services to one or more sub-networks. If multiple configuration management servers or multiple security servers are used on the one or more of the sub-networks these servers may be arraigned in hierarchy to ease the complexity of administration. This hierarchical structure can be nearly identical to one already described.

The one or more security servers 404 authenticate the one or more mobile units 416 associated with the access points 414 on the sub-networks 412. In some embodiments, the mobile unit can authenticate its network connection through the access point using the security server. The security servers typically use a security client 420 on the mobile unit along with stored security information 406 to complete the authentication process. Depending on the implementation, a wide range of authentication schemes may be suitable including, user name and password schemes, symmetric and asymmetric key authentication, and Public Key Infrastructure methods.

In some embodiments, the one or more backbone networks 410 and one or more 412 networks will use one of the versions of the Internet Protocols (IP). One or more Dynamic Host Configuration Protocol (DHCP) servers 422 dynamically allocate IP addresses to the mobile units 416. The DHCP servers may be organized and administered hierarchically. Each DHCP server may provide dynamic IP address assignment to one or more sub-networks. In some embodiments, the configuration management server 400 may act as a proxy for the DHCP server or may contain or encapsulate the DHCP server. In these embodiments, the configuration management server will not allow the DHCP server to assign an IP address to a mobile unit, until it has been properly configured and verified, while the mobile unit is associating with an access point 414.

In some embodiments of the invention the configuration management server 400 the DHCP servers 422, and security server 404 can be implemented using a combination of Lightweight Directory Access Protocol (LDAP) servers and PKI certificate authority servers. These servers can be on one or more servers on the sub-networks 412 or backbone networks 410 or distributed on the access points 414.

One possible simplified process flow for an alternative embodiment of the invention is shown in FIG. 5. It will be understood that the functionality, scope and sprit of this embodiment is identical to those already described and that this brief description is not intended to impose limitations.

When a mobile unit 416 detects an access point 414 it attempts to associate with it 450. The decision to associate with a new access point is based on a variety of standard criteria, such as, the received signal strength indication. The access point responds 452 as required by the protocol being employed (i.e. the IEEE 80.11 family of specifications). This protocol may include an authentication step, using for example, the RADIUS protocol. As part of the association process, the mobile unit typically makes a DHCP IP address assignment request (or other suitable address assignment request) 454, which will be passed by the access point 456 to the configuration management server 400. In some embodiments, the configuration management server acts as a proxy for the DHCP server 422, and will only assign an IP address if the mobile unit is under the required configuration management. Communications with the mobile unit, prior to the assignment of an IP address can use OSI Layer 2 addressing (i.e. the MAC addresses of the mobile unit, access point, configuration management server).

The configuration management server 400 will, optionally, request 458 that security server 404 authenticate the mobile unit 416. The security server issues a challenge 460, which is passed through the access point 414, to the mobile unit 462. The mobile unit issues a response 464 to the challenge, which is passed through the access point, to the security server 466. The security server then transmits an authentication response 468 or confirmation to the configuration management server. Mobile units, which cannot be authenticated, may have the association discontinued, may be allowed to complete a limited association, using a VLAN, for example, or the mobile unit must find another access point to associate with.

The configuration management server 400 issues a configuration request 470, which is transmitted 472 through the access point 414, to the mobile unit 416. The mobile unit responds 474 with information on its configuration and capabilities, which are transmitted 476 through the access point, to the configuration management server. In some embodiments, this information is gathered and supplied by the configuration management client 418. This message may contain information on which access points the mobile unit could associate with. The configuration management server uses the configuration information this information to determine if the mobile unit has the capabilities to complete the requested association. If not, the configuration management server may attempt to update the software or stored data on the mobile unit. Alternatively, the mobile unit can attempt to locate an access point, which it does have the capability to associate with. As another alternative the mobile unit may be allowed to complete a limited association, using a VLAN, for example. In some embodiments, the configuration management server will use stored information on the configuration and capabilities of the mobile unit, rather than polling the mobile unit for this information.

Once the configuration management server 400 has been able to determine the configuration of the mobile unit 416, it sends configuration messages 478, which are transmitted 480 though the access point 414, to the mobile unit. This message may include a list of access points the mobile unit is required to associate with, is preferred to associate with, or access point the mobile unit is forbidden to associate with. The configuration management client 418 uses this information to set configuration parameters on the mobile unit. The configuration management client verifies the configuration and parameter settings, and sends an acknowledgement message 482, through 484 the access point, to the configuration management server.

Once the configuration management server 400 has been able to set and verify the configuration of the mobile unit 416, the configuration management server sends a DHCP request 486 to the DHCP server 422. The DHCP server sends an IP address assignment message 488, to the configuration management server, which transmits 490 the address assignment, through 492 the access point 414, to the mobile unit. The mobile unit and the access point will then perform any actions required by the protocol to complete the association and the mobile unit can begin regular communications.

Other Alternative Embodiments

It will be understood that many other embodiments, which achieve the same functionality and scope of the embodiments described, are possible. For example, some embodiments can store and use part of a mobile unit's 18, 416 configuration profile 28, 402 on the mobile unit itself and part on the configuration management server 10, 400. Other parts of the configuration management profile 30 will be stored on the mobile unit and used directly by the configuration management client 34. This embodiment is, in effect, a hybrid of two embodiments already described.

What is claimed:

1. A normal-communications inhibitor, comprising:
    an electronic device comprising a representation of data;
    the data comprising a program for inhibiting normal wireless communications via at least one wireless local area network between a wireless device and at least one resource;
    the program being configured to allow or inhibit normal communications between the wireless device and the at least one resource based on a compliance determination of whether the wireless device complies with at least one policy;
    the compliance determination being based on at least one structure/function determination of at least one aspect of the structure or function of the wireless device performed by the program executed on the wireless device;
    wherein the at least one policy is selected from a collection of one or more candidate policies based on an identifier of an access point.

2. The system of claim 1, wherein the integrity of software and stored data is verified periodically.

3. The system of claim 1, wherein the policy contains information on required versions of the mobile unit software and stored data.

4. The system of claim 1, wherein the operation of software and network connections or sessions is periodically verified.

5. The system of claim 1 wherein the policy contains information on required versions of the mobile unit hardware.

6. The system of claim 1 wherein the operation of mobile unit hardware is periodically verified.

7. The system of claim 1, wherein the policy comprises security information, the security information further comprising one or more master keys, pre-shared keys, tokens, and/or certificates.

8. The system of claim 1, wherein the policy comprises radio information, the radio information further comprising one or more country codes, transmit signal strength indications, and/or channel indications.

9. The system of claim 1, wherein the policy comprises hardware information, the hardware information further comprising one or more operating system indications, and/or network interface indications.

10. The system of claim 1, wherein the policy comprises software information, the software information further comprising one or more network interface firmware indications, applications software indications, network interface driver indications, protocol enable/disable indications, anti-virus software indications, virtual private network indications, file sharing indications, and/or printer sharing indications.

11. The system of claim 1, wherein the at least one policy is selected from a collection of one or more candidate policies based on an identifier of a sub-network.

12. The system of claim 1 or 11 wherein the identifier of an access point or sub-network is determined from information received via an access point.

13. The system of claim 1 or 11 wherein the identifier of an access point or sub-network comprises at least a portion of an IP address.

14. The system of claim 1 or 11 wherein the identifier of an access point or sub-network comprises an ESSID.

15. A configuration management system, comprising:
- a client program embodied on a wireless device for execution;
- a policy that the wireless device be configured in accord with a determinable profile;
- the client program being configured to determine a BSSID of an access point through which access point the wireless device may communicate, and based on the determination, select a configuration profile from a collection of one or more configuration profiles and to configure the wireless device in accordance with the configuration profile, and
- the client program being further configured to provide an indication that the wireless device is configured in accord with the profile in order to cause a normal-communications inhibitor to permit normal communications between the wireless device and at least one server program.

16. The system of claim 15 wherein the configuration profile for the wireless device is specific to the type of the mobile unit.

17. The system of claim 15 wherein the configuration profile is specific to the application of the wireless device.

18. The system of claim 15 wherein the configuration profile is specific to the user of the wireless device.

19. The system of claim 15 wherein the integrity of software and stored data is verified periodically.

20. The system of claim 15 wherein the configuration profile contains information on required versions of the mobile unit software and stored data.

21. The system of claim 15 wherein the operation software and network connections or sessions is periodically verified.

22. The system of claim 15 wherein the integrity of hardware is verified periodically.

23. The system of claim 15 wherein the configuration management profile contains information on required versions of the wireless device hardware.

24. The system of claim 15 wherein the operation of the wireless device hardware is periodically verified.

25. The system of claim 15 wherein the selected configuration profile is specified by a configuration management server.

26. The system of claim 25 wherein two or more configuration management servers are organized in a hierarchy.

27. The system of claim 26 wherein the configuration management policies from a higher level in the hierarchy can be modified at lower levels.

28. The system of claim 26 wherein new configuration management policies can be created on servers at any level in the hierarchy.

29. The system of claims 26 wherein configuration management policies set at a higher level in the hierarchy cannot be modified at lower levels in the hierarchy.

30. The system of claim 25 wherein the selected configuration profile cannot be modified by users of the wireless device.

31. The system of claim 15 wherein a wireless device not configured in accord with the profile are given limited access to the at least one resource.

32. The system of claim 15 wherein the collection of one or more configuration profiles are stored in the wireless device.

33. The system of claim 32 wherein the collection of one or more configuration profiles is periodically updated by communicating with one or more servers.

34. The system of claim 33 wherein a server authenticates the wireless device before the collection is updated.

35. The system of claim 33 wherein the wireless device authenticates the one or more servers before the collection is updated.

36. The system of claim 33 wherein the one or more servers can load or update software and stored data on the wireless device.

37. The system of claim 36 wherein a server authenticates the wireless device before software is loaded or updated.

38. The system of claim 37 wherein the wireless device authenticates a server before software is loaded or updated.

39. The system of claim 36 wherein the system verifies the integrity of loaded or updated software and stored data prior to using the loaded or updated software and stored data.

40. The system of claim 36 wherein a server maintains records used to ensure compliance with software license terms and conditions.

41. The system of claim 36 wherein software is loaded or updated on the wireless device so that it can be configured in accord with the configuration profile.

42. The system of claim 32 wherein the system verifies the integrity of a configuration profile prior to using the configuration profile.

43. The system of claim 15 wherein the collection of one or more configuration profile is updated to include the profile required by the policy.

44. The system of claim 15 wherein a user of the wireless device can create and modify one or more configuration profiles for the wireless device.

45. A system for the enforcement of configurations of mobile units, comprising
- a configuration management software client on the mobile units,
- one or more servers for controlling the hardware, software and stored data configurations on the mobile units, one or more sub-networks connected to the one or more servers, one or more configuration profiles specific to some of the one or more of the sub-networks on which the mobile units can roam, one or more wireless access points connected to each of the one or more sub-networks and capable of communicating with the mobile units, wherein the integrity of hardware is verified periodically.

46. The system of claim 45 wherein the one or more configuration profile for the mobile unit is specific to the type of the mobile unit.

47. The system of claim 45 wherein the one or more configuration profile is specific to the application of the mobile unit.

48. The system of claim 45 wherein the one or more configuration profile is specific to the user of the mobile unit.

49. The system of claim 45 wherein mobile unit software and stored data configurations are under configuration management.

50. The system of claim 49 wherein the integrity of software and stored data is verified periodically.

51. The system of claim 49 wherein the one or more configuration profile contains information on required versions of the mobile unit software and stored data.

52. The system of claim 49 wherein the operation software and network connections or sessions is periodically verified.

53. The system of claim 45 wherein mobile unit hardware configurations are under configuration management.

54. The system of claim 45 wherein the one or more configuration profile contains information on required versions of the mobile unit hardware.

55. The system of claim 45 wherein the operation of mobile unit hardware is periodically verified.

56. The system of claim 45 wherein a configuration management server determines the profile to be used by the access point the mobile unit associates with.

57. The system of claim 45 wherein the client on the mobile unit determines the identity of the sub-network from information received via the access points.

58. The system of claim 57 wherein the sub-network identifier is the IP sub-network address mask.

59. The system of claim 57 wherein the sub-network is identified by the ESSID as specified in the IEEE 802.11 family of protocols.

60. The system of claim 45 wherein mobile units not able to meet the configuration management requirements for a particular sub-network are not allowed to associate with that sub-network.

61. The system of claim 45 wherein mobile units not able to meet the configuration management requirements for a particular sub-network are given limited access to the applications, data, connections and services on that sub-network.

62. The system of claim 45 wherein one or more configuration profiles are stored in the mobile unit and are invoked when the mobile unit roams to a specific sub-network of the one or more sub-networks.

63. The system of claim 62 wherein the one or more configuration profiles are periodically synchronized between the one or more servers and each mobile unit.

64. The system of claim 63 wherein a server authenticates the mobile unit before the one or more configuration profiles are synchronized.

65. The system of claim 63 wherein the mobile unit authenticates a server before the one or more configuration profiles are synchronized.

66. The system of claim 63 wherein the system verifies the integrity of loaded one or more configuration profiles prior to their use.

67. The system of claim 63 wherein one or more configuration profiles are loaded or updated on the mobile unit so that the profile required for a sub-network become available.

68. The system of claim 45 wherein the one or more servers can update software and stored data on the mobile units 69. The system of claim 68 wherein a server authenticates the mobile unit before software is loaded.

70. The system of claim 68 wherein the mobile unit authenticates a server before software is loaded.

71. The system of claim 68 wherein the system verifies the integrity of loaded software and stored data prior to its use.

72. The system of claim 68 wherein the server maintains records used to ensure compliance with software license terms and conditions.

73. The system of claim 68 wherein software is loaded or updated on the mobile unit so that it can meet the configuration management requirements for a particular sub-network.

74. The system of claim 45 wherein two or more configuration management servers are organized in a hierarchy.

75. The system of claim 74 wherein the configuration management policies from a higher level in the hierarchy can be modified at lower levels.

76. The system of claim 74 wherein new configuration management policies can be created on servers at any level in the hierarchy.

77. The system of claims 75 or 76 wherein configuration management policies set at a higher level in the hierarchy cannot be modified at lower levels in the hierarchy.

78. The system of claim 45 wherein the wireless network uses radio frequency signals.

79. The system of claim 78 wherein the wireless local area network confirms to the IEEE 802.11 family of specifications.

80. The system of claim 78 wherein the wireless local area network conforms to the specifications promulgated by the Bluetooth SIG, Inc.

81. The system of claim 15 or 45 wherein the configuration profile comprises security information, the security information further comprising one or more master keys, pre-shared keys, tokens, and/or certificates.

82. The system of claim 15 or 45 wherein the configuration profile comprises radio information, the radio information further comprising one or more country codes, transmit signal strength indications, and/or channel indications.

83. The system of claim 15 or 45 wherein the configuration profile comprises hardware information, the hardware information further comprising one or more operating system indications, and/or network interface indications.

84. The system of claim 15 or 45 wherein the configuration profile comprises software information, the software information further comprising one or more network interface firmware indications, applications software indications, network interface driver indications, protocol enable/disable indications, anti-virus software indications, virtual private network indications, file sharing indications, and/or printer sharing indications.

* * * * *